(12) United States Patent
Behrmann et al.

(10) Patent No.: US 8,343,399 B2
(45) Date of Patent: Jan. 1, 2013

(54) METHOD FOR PRODUCING PELLETS FROM LARGE PIECES OF RENEWABLE FIBROUS RAW MATERIALS

(75) Inventors: Joachim Behrmann, Wentorf (DE); Axel Buschhart, Lüdge-Elbrinxen (DE); Werner Sitzmann, Hamburg (DE)

(73) Assignee: Amandus Kahl GmbH & Co. KG, Reinbek (DE)

( * ) Notice: Subject to any disclaimer, the term of this patent is extended or adjusted under 35 U.S.C. 154(b) by 20 days.

(21) Appl. No.: 13/060,072

(22) PCT Filed: Jul. 16, 2009

(86) PCT No.: PCT/EP2009/005185
§ 371 (c)(1),
(2), (4) Date: Mar. 3, 2011

(87) PCT Pub. No.: WO2010/020313
PCT Pub. Date: Feb. 25, 2010

(65) Prior Publication Data
US 2011/0147978 A1    Jun. 23, 2011

(30) Foreign Application Priority Data
Aug. 22, 2008    (EP) .................... 08014928

(51) Int. Cl.
*B29C 43/02* (2006.01)
(52) U.S. Cl. .......... 264/115; 264/118; 264/123; 44/590; 44/595; 44/596; 44/606

(58) Field of Classification Search .............. 44/590, 44/606, 595, 596
See application file for complete search history.

(56) References Cited

U.S. PATENT DOCUMENTS

| | | | | | |
|---|---|---|---|---|---|
| 1,551,966 | A | * | 9/1925 | Mulligan et al. | 44/571 |
| 4,015,951 | A | * | 4/1977 | Gunnerman | 44/595 |
| 6,099,770 | A | * | 8/2000 | Akers et al. | 264/86 |
| 6,582,638 | B1 | * | 6/2003 | Key | 264/118 |
| 7,959,692 | B1 | * | 6/2011 | Traeger et al. | 44/550 |

FOREIGN PATENT DOCUMENTS

| | | |
|---|---|---|
| DE | 43 25 069 A1 | 1/1995 |
| DE | 103 34 645 A1 | 3/2005 |
| DE | 10 2004 005034 A1 | 8/2005 |
| DE | 10 2004 030398 A1 | 1/2006 |
| WO | WO 00/18572 A | 4/2000 |

OTHER PUBLICATIONS

English Translation of International Search Report, PCT/EP2009/005185, mailed Mar. 3, 2011.
International Search Report, PCT/EP2009/005185, mailed May 11, 2009.

* cited by examiner

*Primary Examiner* — Mary F Theisen
(74) *Attorney, Agent, or Firm* — Alix, Yale & Ristas, LLP

(57) ABSTRACT

The invention relates to a method for producing pellets from large pieces of renewable fibrous raw materials, such as, in particular, wood, straw, or energy crops, wherein the raw material is chopped up, then dried, and subsequently processed into pellets in a matrix press, characterized in that the material, optionally pre-chopped in choppers or shredders, is chopped in a first matrix press prior to drying.

20 Claims, No Drawings

METHOD FOR PRODUCING PELLETS FROM LARGE PIECES OF RENEWABLE FIBROUS RAW MATERIALS

The invention relates to a method for producing pellets from large pieces of renewable fibrous raw materials, such as, in particular, wood, straw or energy crops, in which the raw material is comminuted, then dried and subsequently processed into pellets in a matrix press.

Renewable fiber-like raw materials, such as, in particular, wood, straw or energy crops, are usually, after being harvested and delivered to the pelletizing factory in the moist state, precomminuted coarsely, dried, recomminuted finely and then, after the addition of steam or water and sometimes addition of suitable binders, processed into pellets (cylindrical bodies with diameters of usually 6 to 12 mm) in matrix presses. Such pellets are delivered for combustion as industrial pellets on a large scale or, on a smaller scale, for domestic fires. The renewable raw materials are available in large quantities not only in the form of wood and other quick-growing plants, but also in the form of wood waste, such as planing chips and other waste from the timber industry. The $CO_2$-neutral use of these raw materials for combustion is highly expedient not only for reasons of environmental protection, but also for economic reasons in view of the rising oil prices and growing energy demand.

The coarse grinding of the moist raw materials (for example, chopped straw or wood shavings of sizes G10 to G100, predominantly G30 or G50) conventionally takes place by means of costly, large-volume hammer mills which operate with energy consumptions of 25-35 kWh per tonne of the product to be ground. Such hammer mills also have the disadvantage that they have to operate with airflows which require complicated dust filters for the exhaust air. Alternatively, recently, chip cutters have also been used which have approximately equal energy consumptions, but necessitate considerable maintenance work, since the knives used for cutting wear quickly and have to be exchanged once per shift and reground.

Pelletizing takes place in matrix presses. In matrix presses, pan-grinding rollers roll on a matrix provided with bores, press the material located on the matrix through the bores and compact it into pellets there (EP 0 143 415 A2). A distinction is made in this context between ring matrix presses and flat matrix presses. Both press systems have proved appropriate for years for the purpose of pelletizing renewable raw materials, in particular straw or wood. While, in ring matrix presses, the rotating matrix rolls uniformly over its entire width over the corotating fixed pan grinders, in the case of the flat matrix press the pan grinders rolling over the matrix describe a circular movement. In contrast to the ring matrix press type, in the last case the material is not only compacted between the pan grinder and matrix and pressed through the holes of the matrix in order to shape the desired pellets, but is additionally subjected to a shearing action on account of the different relative speeds between the pan grinder and matrix over the pan-grinder track.

The object of the invention is to provide a method of the type initially mentioned, which requires less energy in order to produce the pellets.

In the solution according to the invention, the material coarsely precomminuted, where appropriate, in hackers or choppers is comminuted, before drying, in a first matrix press.

In an advantageous embodiment, the material is comminuted in the first matrix press with a water content of at least 15 to 20 percent by weight in the case of straw and of at least 40 to 50 percent by weight in the case of wood and other materials.

Comminution therefore takes place not with a hammer mill or chip cutter, as in the prior art, but in a matrix press. It is known, admittedly, to comminute long-fiber raw materials, such as, for example, straw, parts of plants and wood waste, before pelletization in a matrix press (EP 0 143 415 A2). There, however, dry material is obviously comminuted, since pelletization immediately following the comminution cannot otherwise lead to acceptable pellets because the moisture content of the material is too high. Without sufficient friction, the material would pass through the bores and therefore would not be sufficiently compressed. Moreover, if there is a high water content, the material, when emerging from the pressing ducts in which high pressure prevails, would evaporate abruptly as a result of heating in the second pellet press, thus leading to unacceptable cracks in the pellets and causing these to break up easily or, particularly during further handling, to crumble. Typical moisture contents of the material to be pelletized before pelletization are therefore 10-15% when pellets are produced from sawing or planing chips.

The present invention is based on the surprising finding that the grinding of the still originally moist raw material in a matrix press, in particular a flat matrix press, as an alternative to wet grinding or wet chipping in hammer mills or chip cutters, affords a series of advantages. It is known that products can generally be ground in a matrix press. However, this grinding is only ever carried out with the dry product, as a last method step immediately before pelletization.

In the case of renewable fibrous products, in particular straw or wood, it was shown surprisingly that the product ground by means of a matrix press, in particular a flat matrix press, when wet (in particular, with a water content of about 40-50% in the case of wood) has an entirely different structure, markedly better for subsequent pelletization, than is the case when hammer mills or chip cutters are used. Whereas chip-like, elongate products occur there, in the procedure according to the invention the shearing forces between the pan grinder, material and matrix in a matrix press, in particular a flat matrix press, cause the formation of largely fibrous, almost woolly products which, on account of their structure, can be processed, after drying, into more stable pellets than is the case with conventional comminution. On account of the different structure, the drying of the product ground in accordance with the invention also takes place more quickly and better than after treatment in a hammer mill. The high moisture content which would cause trouble during actual pelletization, as mentioned, in this case surprisingly does not present problems during grinding.

A major economic benefit of the method according to the invention is also that, in conventional wet comminution in hammer mills or chip cutters, large quantities of air are needed in order to operate these machines, which quantities of air become enriched with dust and have to be purified in filter systems before they can be discharged into the atmosphere. In the method according to the invention, purification systems of this type may be dispensed with.

The flat matrix press is therefore also advantageously suitable for the pulping process because its pan-grinding rollers can be driven directly. This ensures that the fed material is comminuted as a result of the rolling pressure stress required for rolling over it. With pan-grinding rollers without a direct drive, such as, for example, in ring matrix presses, there is the risk that, without intrinsic rotation, the pan-grinding rollers slip like a sledge over the moist material without any genuine comminuting action.

Advantageously, cylindrical, not approximately conical pan-grinding rollers are used in the flat matrix press, in order additionally to acquire the shearing action on account of the different relative speeds between the pan grinder and matrix over the pan-grinding track.

Surprisingly, it was shown that, in wet grinding according to the invention by means of a matrix press, in particular a flat matrix press, the required introduction of energy, despite the better comminuting result, is markedly lower than in conventional beating or cutting comminuting methods in a hammer mill or chip cutter.

Should the material not have been sufficiently comminuted in the first matrix press, it may be further comminuted, after drying, by means of a hammer mill. However, the abovementioned hammer mills are no longer required for this purpose, since the material is in any case sufficiently precomminuted. Instead, as a rule, fine comminution of the material after drying can be carried out by means of less costly and complicated hammer mills, such as are known from the feed industry.

We claim:

1. A method for producing pellets from large pieces of renewable fibrous raw materials, comprising the steps of selecting a renewable fibrous raw material from the group of wood, straw and energy crops; coarsely precomminuting the raw material into large pieces in hackers or choppers; comminuting the raw material in a first matrix press; drying the raw material; and processing the raw material into pellets in a second matrix press.

2. The method as claimed in claim 1, characterized in that the material is comminuted in the first matrix press with a water content of at least 15 to 20 percent by weight in the case of straw and of at least 40 to 50 percent by weight in the case of wood and other energy crops.

3. The method as claimed in claim 1, characterized in that the first matrix press is a flat matrix press.

4. The method as claimed in claim 3, characterized in that the first matrix press includes cylindrical pan-grinding rollers.

5. The method as claimed in claim 3, characterized in that the flat matrix press includes driven pan-grinding rollers.

6. The method as claimed in claim 1, characterized in that the material is further comminuted in a hammer mill after drying and before being processed into pellets.

7. The method as claimed in claim 1, characterized in that a flat matrix press is used as a matrix press in which the material is processed into pellets.

8. The method as claimed in claim 1, characterized in that a ring matrix press is used as a matrix press in which the material is processed into pellets.

9. The method as claimed in claim 2, characterized in that the first matrix press is a flat matrix press.

10. The method as claimed in claim 4, characterized in that the pan-grinding rollers are driven.

11. The method as claimed in claim 2, characterized in that the material is further comminuted in a hammer mill after drying and before being processed into pellets.

12. The method as claimed in claim 3, characterized in that the material is further comminuted in a hammer mill after drying and before being processed into pellets.

13. The method as claimed in claim 4, characterized in that the material is further comminuted in a hammer mill after drying and before being processed into pellets.

14. The method as claimed in claim 5, characterized in that the material is further comminuted in a hammer mill after drying and before being processed into pellets.

15. The method as claimed in claim 2, characterized in that a flat matrix press is used as a matrix press in which the material is processed into pellets.

16. The method as claimed in claim 3, characterized in that a flat matrix press is used as a matrix press in which the material is processed into pellets.

17. The method as claimed in claim 4, characterized in that a flat matrix press is used as a matrix press in which the material is processed into pellets.

18. The method as claimed in claim 2, characterized in that a ring matrix press is used as a matrix press in which the material is processed into pellets.

19. The method as claimed in claim 3, characterized in that a ring matrix press is used as a matrix press in which the material is processed into pellets.

20. The method as claimed in claim 4, characterized in that a ring matrix press is used as a matrix press in which the material is processed into pellets.

* * * * *